(12) United States Patent
Lofthus et al.

(10) Patent No.: US 7,746,524 B2
(45) Date of Patent: Jun. 29, 2010

(54) BI-DIRECTIONAL INVERTER PRINTING APPARATUS AND METHOD

(75) Inventors: Robert M. Lofthus, Webster, NY (US); Steven R. Moore, Rochester, NY (US); Robert A. Clark, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 1222 days.

(21) Appl. No.: 11/317,167

(22) Filed: Dec. 23, 2005

(65) Prior Publication Data
US 2007/0159670 A1    Jul. 12, 2007

(51) Int. Cl.
H04N 1/04    (2006.01)

(52) U.S. Cl. .................. 358/498; 271/186; 271/227; 271/272; 271/278; 399/364; 347/264; 347/262

(58) Field of Classification Search .................. None
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A * | 5/1993 | Horie et al. | 399/110 |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,567,246 A * | 10/1996 | Bowden | 134/25.4 |
| 5,568,246 A | 10/1996 | Keller et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Mark K Zimmerman
*Assistant Examiner*—Jacky X Zheng
(74) *Attorney, Agent, or Firm*—Fay Sharpe LLP

(57) ABSTRACT

According to one aspect of this disclosure, a printing apparatus and method is provided. The printing apparatus comprising a media sheet first inverter and a media sheet second inverter, the first inverter and second inverter operatively connected to provide a media sheet pass-through route, wherein the media sheet pass-through route transports a media sheet through the first inverter and the second inverter.

According to another aspect of this disclosure, a printing system is disclosed. The printing system comprising an inverter module. The inverter module comprising a first media sheet input/output zone, and a second media sheet input/output zone, the first and second media sheet input/output zones operatively connected to provide a media sheet pass-through route. The inverter module is configured to selectably route a media sheet to a printing device for image transfer and the inverter module is configured to invert a media sheet from the printing device media sheet output.

8 Claims, 7 Drawing Sheets

U.S. PATENT DOCUMENTS

| | | | |
|---|---|---|---|
| 5,570,172 | A | 10/1996 | Acquaviva |
| 5,596,416 | A | 1/1997 | Barry et al. |
| 5,629,762 | A | 5/1997 | Mahoney et al. |
| 5,710,968 | A | 1/1998 | Clark et al. |
| 5,778,377 | A | 7/1998 | Marlin et al. |
| 5,884,910 | A | 3/1999 | Mandel |
| 5,963,770 | A * | 10/1999 | Eakin .......................... 399/364 |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 * | 9/2002 | Conrow ...................... 400/582 |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 * | 8/2003 | Conrow ...................... 399/364 |
| 6,612,566 | B2 * | 9/2003 | Stoll .......................... 271/186 |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 7,206,536 | B2 * | 4/2007 | Julien ......................... 399/110 |
| 7,258,340 | B2 * | 8/2007 | Clark et al. ................. 271/228 |
| 7,336,920 | B2 * | 2/2008 | Anderson et al. .......... 399/341 |
| 2002/0078012 | A1 | 6/2002 | Ryan et al. |
| 2002/0103559 | A1 | 8/2002 | Gartstein |
| 2003/0077095 | A1 * | 4/2003 | Conrow ...................... 399/364 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2006/0214364 | A1 * | 9/2006 | Clark et al. ................. 271/228 |
| 2007/0031170 | A1 * | 2/2007 | deJong et al. .............. 399/401 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23,2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.

* cited by examiner

# BI-DIRECTIONAL INVERTER PRINTING APPARATUS AND METHOD

CROSS REFERENCE TO RELATED PATENTS AND APPLICATIONS

The following applications, the disclosures of each being totally incorporated herein by reference are mentioned:

Application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

Application Ser. No. 11/235,979, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE", and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

Application Ser. No. 11/236,099, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE", and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. application Ser. No. 10,761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Robert M. Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. application Ser. No. 11/000,158, filed Nov. 30, 2004, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/000,258, filed Nov. 30, 2004, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark, et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. C-I-P application Ser. No. 11/137,273, filed May 25, 2005, entitled "PRINTING SYSTEM," by David G. Anderson, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,460, filed Jun. 24, 2005, entitled "GLOSSING SUBSYSTEM FOR A PRINTING DEVICE," by Bryan J. Roof, et al.;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM", by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS", by Goodman, et al.;

U.S. application Ser. No. 11/234,553, filed Sep. 23, 2005, entitled "MAXIMUM GAMUT STRATEGY FOR THE PRINTING SYSTEMS", by Michael C. Mongeon;

U.S. application Ser. No. 11/234,468, filed Sep. 23, 2005, entitled "PRINTING SYSTEM", by Eric Hamby, et al.;

U.S. application Ser. No. 11/247,778, filed Oct. 11, 2005, entitled "PRINTING SYSTEM WITH BALANCED CONSUMABLE USAGE", by Charles Radulski, et al.;

U.S. application Ser. No. 11/248,044, filed Oct. 12, 2005, entitled "MEDIA PATH CROSSOVER FOR PRINTING SYSTEM", by Stan A. Spencer, et al.; and U.S. application Ser. No. 11/274,638, filed Nov. 15, 2005, entitled "GAMUT SELECTION IN MULTI-ENGINE SYSTEMS", by Wencheng Wu, et al.;

U.S. application Ser. No. 11/287,177, filed Nov. 23, 2005, entitled "MEDIA PASS THROUGH MODE FOR MULTI-ENGINE SYSTEM", by Barry P. Mandel, et al.;

U.S. application Ser. No. 11/466,842, filed Nov. 28, 2005, entitled "MULTIPLE IOT PHOTORECEPTOR BELT SEAM SYNCHRONIZATION, by Kevin M. Carolan;

U.S. application Ser. No. 11/358,587, filed Nov. 30, 2005, entitled "MEDIA PATH CROSSOVER CLEARANCE FOR PRINTING SYSTEM", by Keith L. Willis;

U.S. application Ser. No. 11/145,603, filed Nov. 30. 2005, entitled "PRINTING SYSTEM", by David A. Mueller;

U.S. application Ser. No. 11/361,787, filed Nov. 30, 2005, entitled "RADIAL MERGE MODULE FOR PRINTING SYSTEM", by Barry P. Mandel, et al.;

U.S. application Ser. No. 11/291,583, filed Nov. 30, 2005, entitled "MIXED OUTPUT PRINTING SYSTEM", by Joseph H. Lang; and

BACKGROUND

The present disclosure relates to a xerographic printing system. Specifically, a xerographic printing system that may include one or more printing devices, where one or more of the printing devices include a media sheet inverter. In addition, this disclosure is related to a printing system that may include a media sheet inverter independently operatively coupled to one or more printing devices.

In a typical xerographic printing device, such as a copier or printer, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper. The fusing of the toner to the paper is generally accomplished by applying heat to the toner with a heated nip and application of pressure. In multi-color printing, successive latent images corresponding to different colors are recorded on the photoconductive surface and developed with toner of a complementary color. The single color toner images are successively transferred to the print media to create a multi-layered toner image on the paper. The multi-layered toner image is permanently affixed to the print media paper during the fusing process.

A common trend in the office equipment market, particularly in relation to copiers and printers, is to organize a printing system on a modular basis, wherein distinct subsystems of the printing system are configured into modules which can be readily removed from the printing system and replaced with other modules. A modular design facilitates servicing and repair since a service provider can remove a module from the printing system and repair the module at a convenient place with minimal disruption to the operation of the printing system.

Recently, printing systems have been developed which include a plurality of printing modules, where the printing modules are integrated such that a media sheet can travel from one printing module to another via a media sheet path. These systems enable high overall outputs by printing portions of the same document on multiple printers. Such systems are sometimes referred to as "tandem engine" printers, "parallel" printers, and "cluster printing", in which a print job may be allocated among multiple printing modules, such as separate printing for the color and monochrome pages.

As discussed above, printing systems can include color printing modules and black printing modules. A cyan, magenta and yellow (CMY) printing module can print in color or black. However, the cost of producing a black only print on a color printing module is often higher than printing a black only print on a monochrome printing device. For example, some color printing devices require the media sheet to be circulated through an image transfer zone multiple times to produce a color or black only print. Another added cost can be associated with the toner required for a color printing device as compared to a monochrome printing device.

In addition to printing systems which include a combination of color printing modules and monochrome printing modules, some printing systems include only color printing modules or only monochrome printing modules. These printing systems may be configured to provide a variety of print sequencing operations to maximize printing thruput and/or minimize overall operational costs.

To provide additional functionality to a printing system device and enable two sided printing, a duplex printing operation can be implemented utilizing a media sheet inverter. Media sheet inverters can be located at the input and/or output of a printing device. The media sheet inverter simply inverts a media sheet for subsequent printing by one or more printing devices.

As can be appreciated from the discussion heretofore, the integration of multiple printing devices provides a multitude of media sheet routing possibilities. In addition, by integrating printing devices which can have different media sheet processing cycle times, management of media sheet routing through the printing system can be important to maximize the throughput and minimize costs.

BRIEF DESCRIPTION

An apparatus comprising a media sheet inverter is disclosed. The inverter apparatus comprising a media sheet first inverter and a media sheet second inverter, the first inverter and second inverter operatively connected to provide a media sheet pass-through route, wherein the media sheet pass-through route transports a media sheet through the first inverter and the second inverter.

According to another aspect of this disclosure, a method of routing a media sheet through a media sheet inverting apparatus is disclosed. The method comprising operatively coupling a media sheet first inverter and a media sheet second inverter associated with the said inverting apparatus, and routing a media sheet through the first inverter and second inverter.

According to another aspect of this disclosure, a printing apparatus is disclosed comprising an inverter module wherein a first and second media sheet inverter input/output are operatively connected to provide a media sheet pass-through route, and a printing device comprising a media sheet input, a media sheet image transfer zone, and a media sheet output, wherein the printing device is operatively connected to the inverter module. Moreover, the inverter module is configured to selectably route a media sheet to the printing device for image transfer and the inverter module is configured to selectable invert a media sheet from the printing device media sheet output.

DETAILED DESCRIPTION

This disclosure provides a printing system inverter arrangement that functions as a media sheet inverter and/or a redundant section of a media transportation highway. By providing one or more redundant sections of media transportation highway, a printing system that includes a limited number of primary media sheet routing paths, is able to bypass a primary media sheet routing path segment via the inverter, in the event the primary media sheet routing segment is disabled. In addition, the inverter, operating as a redundant section of the media transportation highway, can provide a staging or holding area for a media sheet area for a media sheet for proper sequencing to the media transportation highway.

Figure 1:
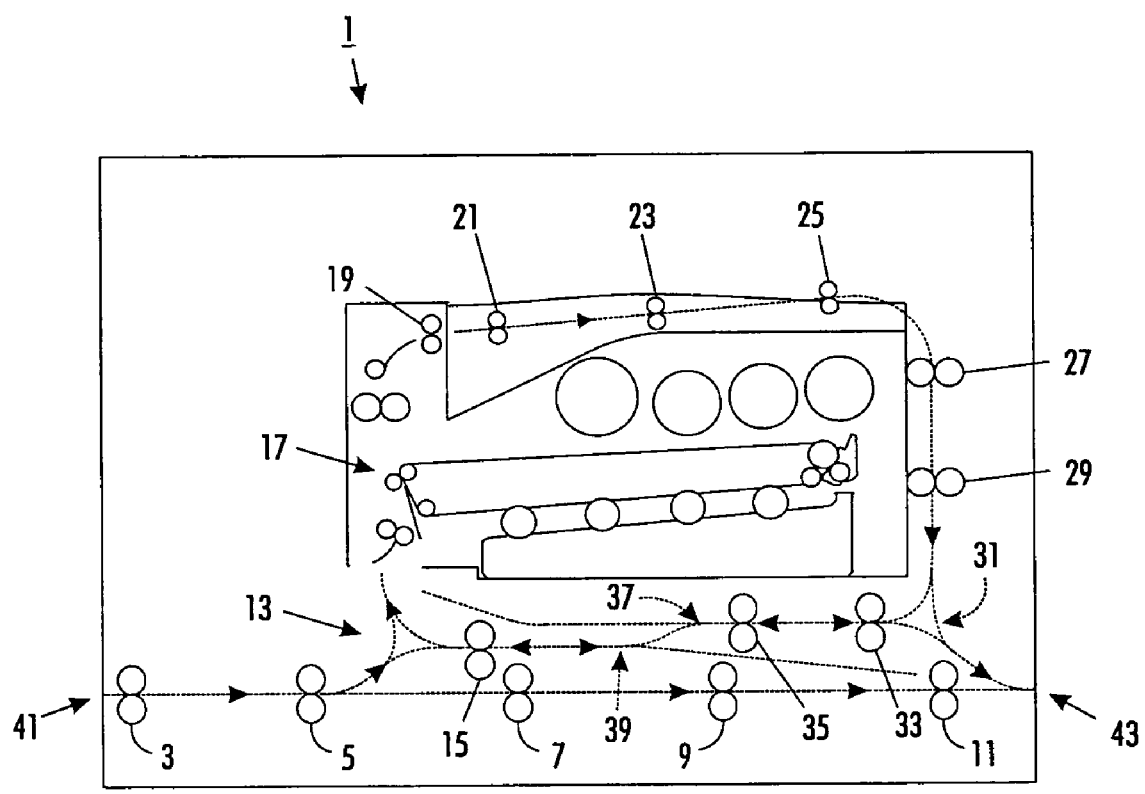
FIG. 1 is an illustration of a printing apparatus according to an exemplary embodiment of this disclosure.

With reference to FIG. 1, illustrated is a printing module 1 according to one exemplary embodiment of this disclosure.

The printing module 1 includes a media sheet transportation highway which is integrated with an inverter and image marking components representative of a printing device. The printing module 1 includes a media sheet input 41 and media sheet output 43. A media sheet highway includes media sheet nips 3, 5, 7, 9 and 11. The inverter arrangement includes an input path inverter 13 and an output path inverter 31. The input path inverter 13 includes nip 15 and the output path inverter includes nip 33 and nip 35. In addition, the input path inverter 13 and output path inverter 31 are coupled to provide a media sheet path from the input path inverter 13 to the output path inverter 31 at sections 37 and 39.

During input inversion printing operation, a media sheet is routed along nip 3 to nip 5. Subsequently, the media sheet is routed to the input path inverter 13 via nip 15 as the arrows illustrated indicate. The media sheet subsequently travels to the image transfer zone 17 in an inverted state. After fusing within the printing device, the media sheet continues to travel through the printing device via nips 19, 21, 23, 25, 27 and 29, respectively.

At this point, the media sheet can be inverted via the output path inverter 31, which includes nips 33 and 35, or the media sheet can be routed to the media sheet highway output 43. During an alternate printing operation, the media sheet bypasses the input path inverter 13 and nip 15, and proceeds to the image transfer zone 17 in a non-inverted configuration. Subsequent processing of the media sheet is identical to the input inversion printing operation discussed above.

The printing module illustrated in FIG. 1, also provides an output inversion printing operation. This includes inverting the media sheet utilizing the output path inverter 31. A media sheet is routed from nip 29 to nip 33, then nip 35. Subsequently the media sheet is routed to the media path highway output 43 in an inverted state.

As will be known by those of skill in the art, the media sheet routing within the printing device to transfer an image to the media sheet can be accomplished in a variety of ways. Other image transfer devices and media sheet transportation directly to and from an image transfer zone is possible and within the scope of this disclosure.

With further reference to FIG. 1, the operation of the inverter as a redundant section of media sheet highway is now provided.

A media sheet enters the printing module 1 via a highway path 41 and process along media nip 3 and 5. At this point, the media sheet enters the input path inverter 13 and proceeds along nip 15. At this stage, the media sheet is routed from the input path inverter at point 39 to the output path inverter at point 37. The media sheet is subsequently routed along nip 35 and nip 33 before being routed to the printing module output 43.

Another aspect of the inverter, operating as a redundant section of media sheet highway, includes routing a media sheet into the output path inverter 31 along nip 33 and nip 35. The media sheet is subsequently routed from the output path inverter at point 37 to the input path inverter at point 39. The media sheet then travels along nip 15 wherein it is routed to the image transfer zone 17. The routing of the media sheet proceeds, as previously discussed, via nip 19, 21, 23, 25, 27 and 29. At this point, the media sheet can be cycled through the printing device again via the inverter, inverted and routed to the printing module output 43, or routed directly to the printing module output 43.

Figure 2:
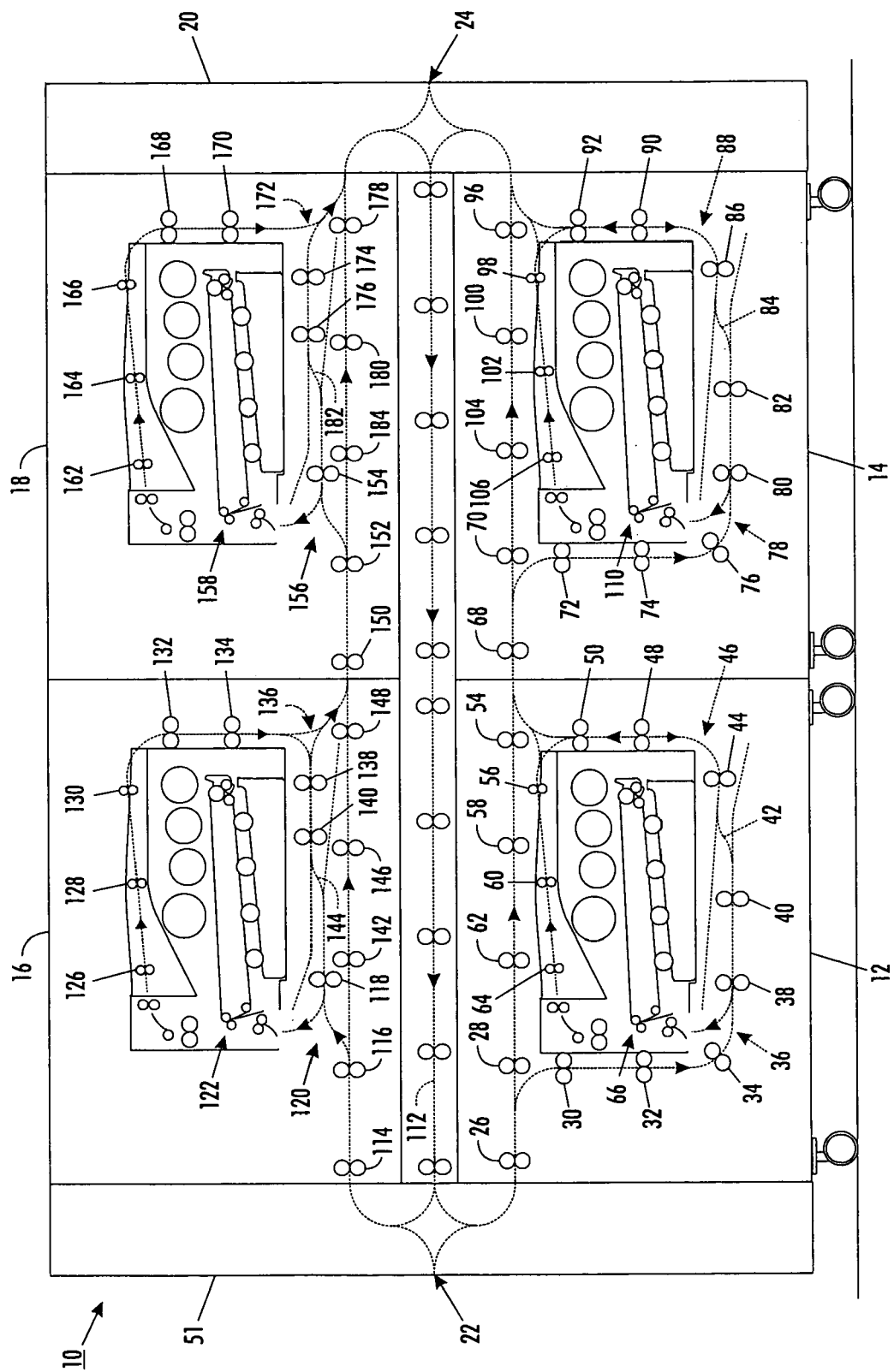
FIG. 2 is an illustration of a printing apparatus according to another exemplary embodiment of this disclosure.

With reference to FIG. 2, illustrated is another embodiment of this disclosure which integrates multiple printing modules. This printing system 10 includes a first printing module 12, a second printing module 14, a third printing module 16 and a fourth printing module 18. The printing modules are integrated via a media sheet highway 112 and media sheet interface modules 20 and 51. The interface modules 20 and 51 can be coupled to other printing systems, a feeder module, a finisher module, a fuser module, or other media sheet processing modules.

Printing modules 12 and 14 are configured to provide an inverter positioned below the primary media sheet highway 112 and printing modules 16 and 18 are configured to provide an inverter positioned above the primary media sheet highway 112. Printing module 12 includes an input nip 26, and nips 28, 62, 58 and 54 which provide media sheet routing to printing module 14. Media nips 30, 32, and 34 provide the routing path from nip 26 to an inverter. The inverter operates as previously discussed with reference to FIG. 1 and the input path includes inverter 36, nip 38 and nip 40. In addition, the output path inverter 46 includes nip 44. A media sheet crossover 42 from the input path inverter 36 to the output path inverter 46 provides a media sheet routing path from the input path inverter 36 to the output path inverter 46. To facilitate image marking, the printing module 12 includes an image transfer zone 66 and media sheet nips 64, 60 and 56. Media sheet nips 50 and 48 route a media sheet to the output path inverter 46.

Printing module 14 includes an input nip 68 and nips 70, 104, 100 and 96 which provide media sheet routing from printing module 12 to the interface module 20. Media sheet nips 72, 74 and 76 provide the routing path from nip 68 to an inverter arrangement. The inverter operates as previously discussed with reference to FIG. 1 and the input path inverter 78 includes nips 80 and 82. In addition, the output path inverter 88 includes nip 86. A media sheet crossover 84 from the input path inverter 78 to the output path inverter 88 provides a media sheet routing path from the input path inverter 78 to the output path inverter 88. To facilitate image marking, the printing module 14 includes an image transfer zone 110 and media sheet nips 106, 102 and 98. Media sheet nips 92 and 90 route a media sheet to the output inverter 88.

Printing module 16 includes an input nip 114 and nips 116, 142, 146 and 148 which provide media sheet routing from the interface module 51, through printing module 16, to printing module 18. Media sheet nip 116 provides media sheet routing to the inverter. Specifically, routing into the input path inverter 120, which includes nip 118. The inverter operates as previously discussed with reference to FIG. 1 and the inverter includes an output path inverter, the output path inverter including nips 138 and 140. A media sheet crossover 144 provides a media sheet routing path from the input path inverter 120 to the output path inverter 136. To facilitate image marking, the printing module 16 includes an image transfer zone 122 and media sheet nips 126, 128, 130, 132 and 134. Subsequent to routing the media sheet via nip 134, the media sheet is either routed to the output path inverter 136 or to the printing module output.

Printing module 18 includes an input nip 150 and nips 152, 184, 180 and 178 which provide media sheet routing from printing module 16, through printing module 18, to the interface module 20. Media sheet nips 152 provide media sheet routing to the inverter. Specifically, routing into the input path inverter 156, which includes nip 154. The inverter operates as previously discussed with reference to FIG. 1 and the inverter includes an output path inverter 172, the output path inverter 172 including nips 174 and 176. A media sheet cross over 182 provides a media sheet routing path from the input path inverter 156 to the output path inverter 172. To facilitate image marking, the printing module includes an image transfer zone 158 and media sheet nips 162, 164, 166, 168 and 170. Subsequent to routing the media sheet via nip 170, the media sheet is either routed to the interface module 20 or the output path inverter 172.

Figure 3:
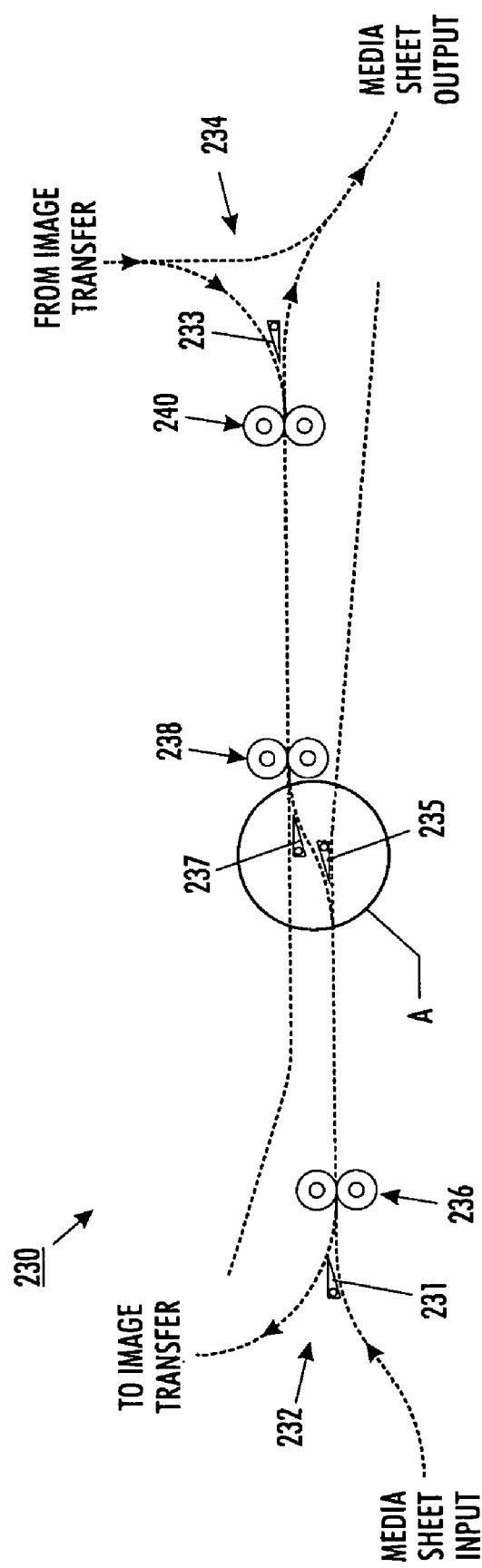
FIG. 3 is an illustration of an inverter apparatus according to an exemplary embodiment of this disclosure.

With reference to FIG. 3, illustrated is an inverter 230 according to an exemplary embodiment of this disclosure. Specifically, illustrated is a media sheet inverter 230 including an input path inverter 232 and an output path inverter 234.

The input path inverter 232 includes a first decision gate 231, a media sheet nip 236 and a second decision gate 235. The output path inverter 234 includes a first decision gate 233, media sheet nips 240 and 238, and a second decision gate 237.

A media sheet routed to the inverter via the path indicated as Media Sheet Input, is directed to nip 236 via the decision gate 231 oriented as illustrated. To direct a media sheet from the input path inverter 232 to the image transfer portion of a printing module, the decision gate 231 is lowered to route the media sheet appropriately.

A media sheet routed to the inverter from the image transfer portion of a printing module is routed through decision gate 233 with the position of the decision gate 233 as illustrated. To direct a media sheet from the output path inverter 234 to the media sheet output, the decision gate 233 is raised to direct the media sheet below the decision gate 233.

Figure 4A:
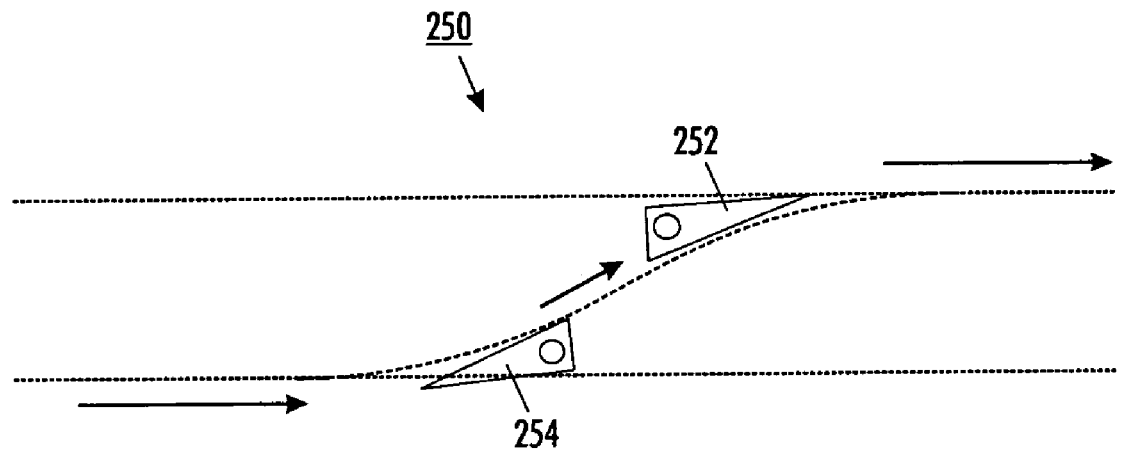
FIGS. 4A and 4B are further illustrations of the inverter apparatus according to FIG. 3.
Figure 4B:
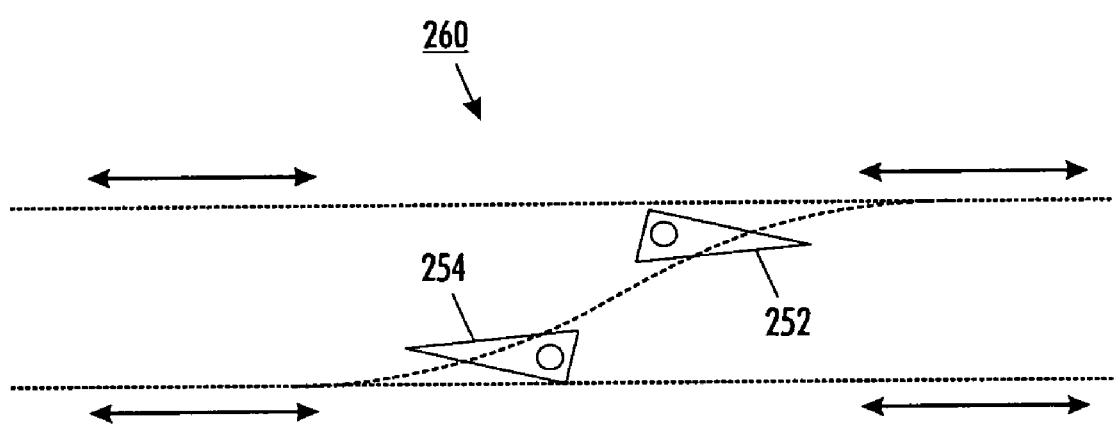

With reference to FIGS. 4A and 4B, the media sheet crossover part of the inverter, identified as "A", will now be described.

FIG. 4A illustrates the path of a media sheet crossing over 250 from an input path inverter to the output path inverter. Decision gate 254 is controlled to be in a lowered position and decision gate 252 is controlled to be in an upward position. This allows a media sheet to travel above decision gate 254 and below decision gate 252. Consequently, the media sheet crosses over from the input path inverter to the output path inverter.

FIG. 4B illustrates the operation of the input path inverter and output path inverter during a media sheet inversion process 260. To invert a media sheet via the input path inverter, decision gate 254 is controlled to be in an upward position, thereby preventing the media sheet from crossing over to the output path inverter. Consequently, the media sheet is inverted by traveling along the bidirectional path indicated to an image transfer path as illustrated in FIG. 3.

To invert a media sheet via the output path inverter, decision gate 252 is controlled to be in a lowered position, thereby preventing the media sheet from crossing over to the input path inverter. Consequently, the media sheet is inverted by traveling along the bidirectional path indicated to the media sheet output as illustrated in FIG. 3.

Figure 5:
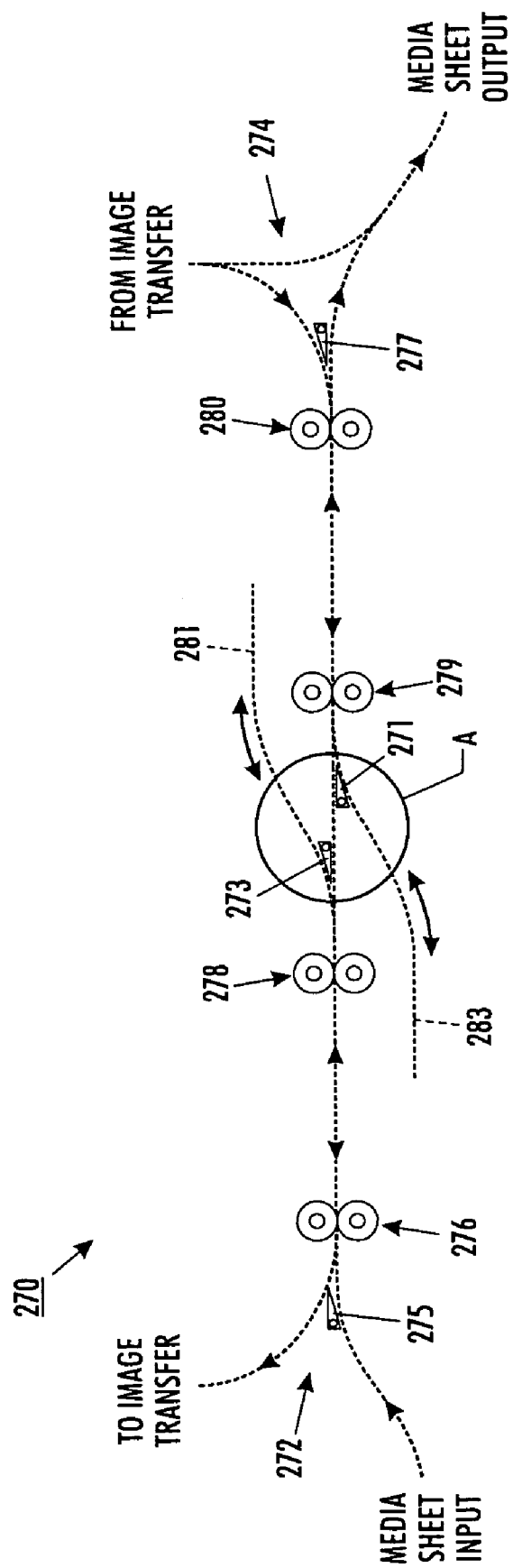
FIG. 5 is an illustration of an inverter apparatus according to another exemplary embodiment of this disclosure.

With reference to FIG. 5, illustrated is another exemplary embodiment of an inverter 270 according to this disclosure. Specifically, illustrated is a media sheet inverter including an input path inverter 272 and an output path inverter 274.

The input path inverter 272 includes a first decision gate 275, a media sheet nip 276 and a second decision gate 273. The output path inverter 274 includes a first decision gate 277, media sheet nips 279 and 280, and a second decision gate 271. Decision gates 273 and 271 are horizontally aligned to provide a media sheet pass-through route passing under the decision gates 273 and 271. The input path inverter 272 includes an upper path segment 281 for media sheet inversion and the output path inverter 274 includes a lower path segment 283 for media sheet inversion.

During operation, a media sheet can be routed to the inverter via the path indicated as media sheet input. Decision gate 275 is positioned to direct the media sheet through media nip 276. Subsequent to the media sheet traveling through nip 278, decision gate 273 directs the media sheet either to the upper path segment 281 for inversion or towards decision gate 271 to route the media sheet through the output path inverter 274. Media sheet nips 279 and 280 route the media sheet to decision gate 277 which directs the media sheet towards the media sheet output.

Also during operation, a media sheet can be routed to the inverter via a path from the image transfer zone. The media sheet is directed to the output path inverter 274 by decision gate 277, which enables the media sheet to pass through media nips 280 and 279. Subsequent to the media sheet traveling through nip 279, decision gate 271 directs the media sheet either to the lower path segment 283 for inversion or towards decision gate 273 to route the media sheet through the input path inverter 272. Media sheet nips 278 and 276 transport the media sheet to decision gate 275 which routes the media sheet towards transfer zone for further processing.

Figure 6A:
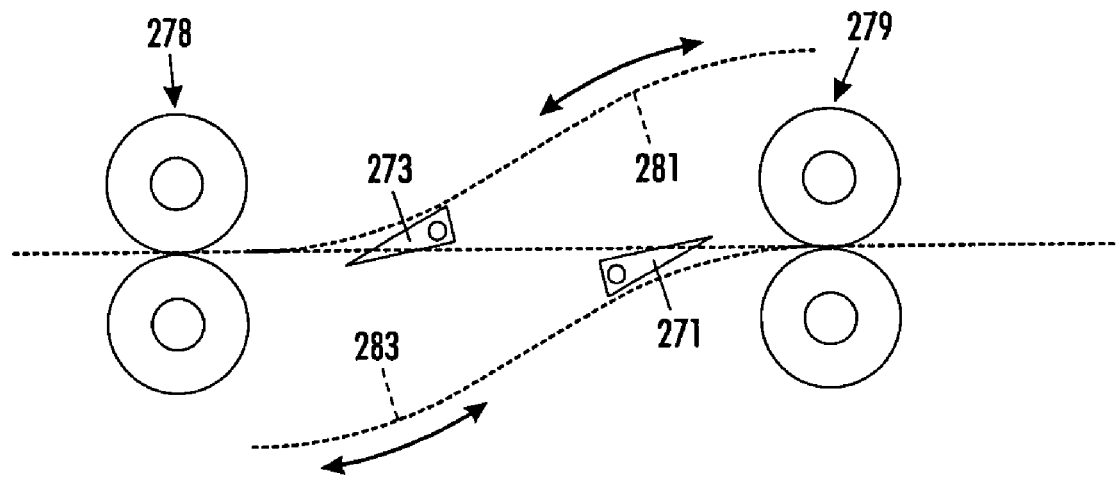
FIGS. 6A and 6B are further illustrations of the inverter apparatus according to FIG. 5.
Figure 6B:
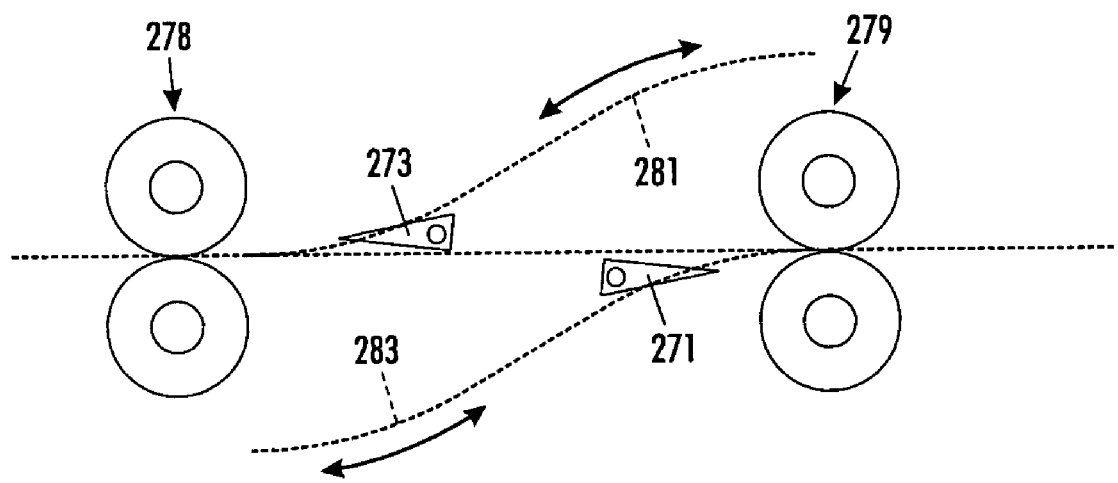

FIGS. 6A and 6B illustrate the positions of decision gates 271 and 273 as related to directing a media sheet. FIG. 6A illustrates the positions of decision gates 271 and 273 to route a media sheet, for inversion, to the lower path segment 283 and upper path segment 281, respectively. FIG. 6B illustrates the positions of decision gates 271 and 273 to route a media sheet through the inverter.

Figure 7:
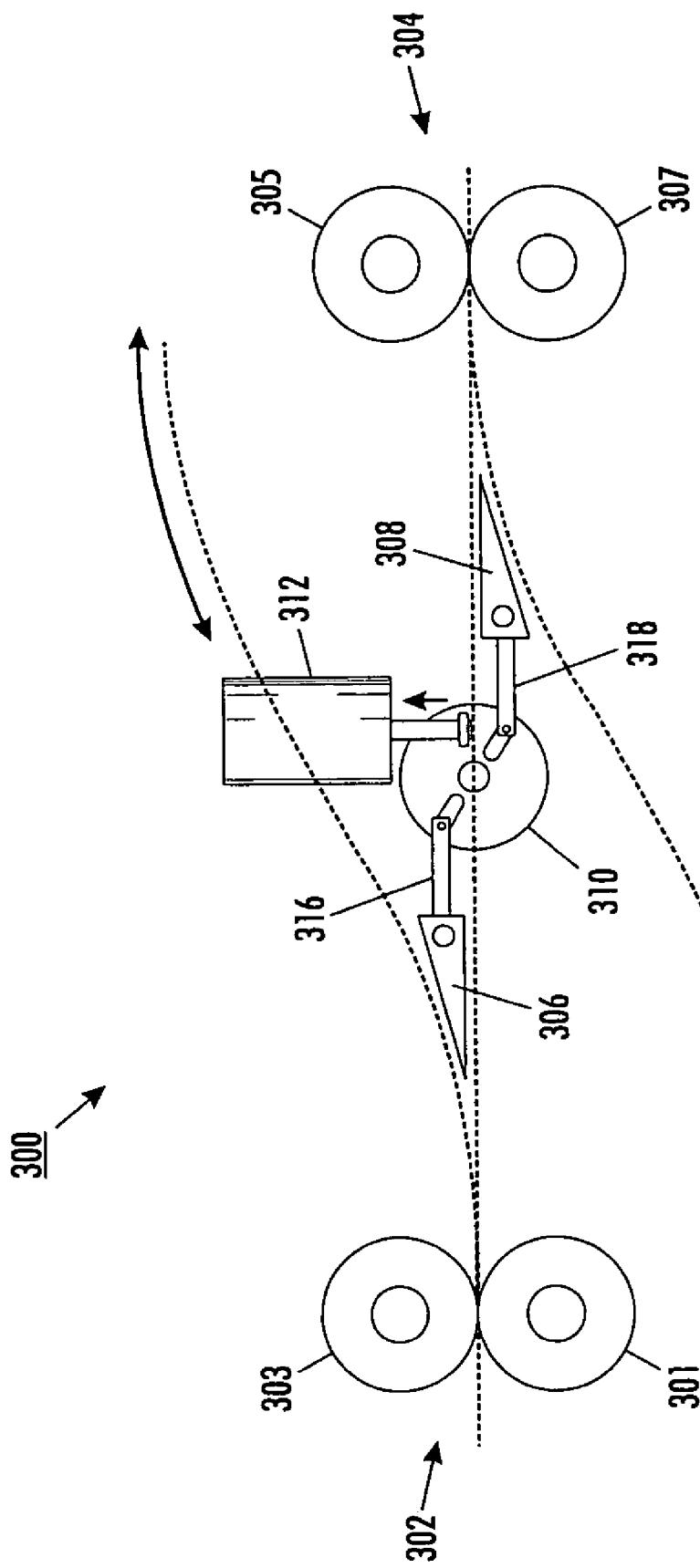
FIG. 7 is an illustration of an inverter apparatus according to another exemplary embodiment of this disclosure.

With reference to FIG. 7, illustrated is a representation of an inverting apparatus 300 according to an exemplary embodiment of this disclosure. The inverter apparatus 300 includes an input path inverter 302 and an output path inverter 304.

The input path inverter 302 includes a media sheet nip comprising a top roller 303 and a bottom roller 301. A decision gate 306 directs a media sheet to either the upper path segment of the input path inverter 302 or alternatively, the decision gate 306 directs a media sheet to pass-through the inverter apparatus 300.

The output path inverter 304 includes a media sheet nip comprising a top roller 305 and bottom roller 307. A decision gate 308 directs a media sheet to either the lower path segment of the output path inverter or alternatively, the decision gate 308 directs a media sheet to pass-through the inverter apparatus.

As illustrated in FIG. 7, an actuator 312 attached to a coupler 310, positions decision gates 306 and 308 to either invert a media sheet or alternatively, direct a media sheet through the inverter apparatus. The decision gates 306 and 308 are attached to the coupler 310 with arm assemblies 316 and 318 respectively.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing apparatus comprising:
   an image transfer zone configured to transfer an image to a media sheet, the image transfer zone including a media sheet input and a media sheet output; and a media sheet inverter apparatus including
  a first media sheet input,
  a first media sheet output operatively connected to the image transfer zone media sheet input,
  a second media sheet input operatively connected to the image transfer zone media sheet output,
  a second media sheet output,
  a bi-directional media sheet inverter operatively connected to the first media sheet input, the first media sheet output, the second media sheet input and the second media sheet output, wherein the bi-directional media sheet inverter is configured to invert a media sheet received at the first media sheet input, invert a media sheet received at the second media sheet input, and route a media sheet received at the first media sheet input to the second media sheet output using a pass-through route providing a redundant media sheet route bypassing the image transfer zone,
    a first gate operatively connected to the bi-directional media sheet inverter and configured to route a media sheet received at the first media sheet input to the bi-directional media sheet inverter for inverting or routing to the second media sheet output, and the first gate is configured to route an inverted media sheet from the bi-directional media sheet inverter to the first media sheet output, and
    a second gate operatively connected to the bi-directional media sheet inverter and configured to route a media sheet received at the second media sheet input to the bi-directional media sheet inverter for inverting and the second gate configured to route an inverted media sheet from the bi-directional media sheet inverter to the second media sheet output.

2. The printing apparatus according to claim 1, further comprising:
  a first media sheet transport highway operatively connected to the first media sheet input and the second media sheet output.

3. The printing apparatus according to claim 2, further comprising:
  two or more printing modules horizontally aligned, each printing module including an image transfer zone and a media sheet inverter apparatus, wherein the first media sheet transport highway is operatively connected to route a media sheet from the first printing module to the second printing module.

4. The printing apparatus according to claim 2, further comprising:
  a first and second media sheet interface module; and
  two or more sad printing modules vertically aligned, each printing module including an image transfer zone and a media sheet inverter apparatus, wherein the first and second media sheet modules are operatively connected to the printing modules to route a media sheet from the first printing module to the second printing module.

5. The printing apparatus according to claim 2, wherein the media sheet inverter apparatus pass-through route transports media sheets at a first speed and the first media sheet transport highway transports media sheets at a second speed.

6. The printing apparatus according to claim 1, further comprising:
  a media sheet feeder module;
  two or more printing modules horizontally aligned, each printing module including an image transfer zone and a media sheet inverter apparatus;
  two or more printing modules vertically aligned, each printing module including an image transfer zone and a media sheet inverter apparatus;
  a media sheet transport highway; and
  a media sheet finisher module, wherein the media sheet transport highway is configured to route a media sheet from the feeder module to one or more printing modules and from one or more printing modules to the finisher module.

7. The printing apparatus according to claim 1, further comprising:
  a second media sheet transport highway operatively connected to the first media sheet transport highway.

8. The printing apparatus according to claim 1, wherein the media sheet inverter apparatus is configured to hold and release a media sheet for proper sequencing.

* * * * *